(12) United States Patent
Tamm et al.

(10) Patent No.: US 7,290,745 B2
(45) Date of Patent: Nov. 6, 2007

(54) SIDE OPENING, DOUBLE ENVELOPING WEDGE CLAMP

(75) Inventors: Carl R. Tamm, Trussville, AL (US); Lawrence E. Bradford, Hoover, AL (US); Robert G. Hay, Pelham, AL (US)

(73) Assignee: Hubbell Incorporated, Orange, CT (US)

( * ) Notice: Subject to any disclaimer, the term of this patent is extended or adjusted under 35 U.S.C. 154(b) by 100 days.

(21) Appl. No.: 10/910,793

(22) Filed: Aug. 4, 2004

(65) Prior Publication Data

US 2006/0027721 A1 Feb. 9, 2006

(51) Int. Cl.
*A47B 96/06* (2006.01)
(52) U.S. Cl. .............................. 248/229.12; 248/229.13
(58) Field of Classification Search ........... 248/229.11, 248/229.12, 229.13, 229.14, 229.15, 229.2, 248/229.21, 229.22, 229.23, 229.24, 229.25, 248/222.52, 292.14, 294.1; 24/489, 490, 24/492, 498, 515, 522, 536, 539; 269/122, 269/136, 138, 139, 234, 256
See application file for complete search history.

(56) References Cited

U.S. PATENT DOCUMENTS

| | | | |
|---|---|---|---|
| 1,080,472 A | 12/1913 | Parker et al. | |
| 2,700,808 A | 2/1955 | Wells et al. | |
| 3,047,263 A * | 7/1962 | Mittenzwei | 248/72 |
| 3,463,430 A * | 8/1969 | Jimenez et al. | 42/124 |
| 4,799,444 A * | 1/1989 | Lisowski | 114/221 R |
| 4,846,431 A * | 7/1989 | Pflieger | 248/228.4 |
| 4,895,338 A * | 1/1990 | Froutzis | 248/503.1 |
| 5,112,015 A * | 5/1992 | Williams | 248/236 |
| 5,413,063 A * | 5/1995 | King | 114/221 R |
| 5,582,377 A * | 12/1996 | Quesada | 248/229.12 |
| 5,598,785 A * | 2/1997 | Zaguroli, Jr. | 104/111 |
| 5,711,397 A * | 1/1998 | Flora et al. | 182/3 |
| 6,276,651 B1 * | 8/2001 | Dolan | 248/538 |
| 6,286,797 B1 * | 9/2001 | Thaxton | 248/229.14 |
| 6,494,642 B1 * | 12/2002 | Daly | 405/36 |
| 6,688,569 B1 * | 2/2004 | Weiss | 248/229.15 |
| 6,719,255 B2 * | 4/2004 | Chen | 248/323 |

* cited by examiner

*Primary Examiner*—A. Joseph Wujciak, III
(74) *Attorney, Agent, or Firm*—Jenae C. Avallone; Mark S. Bicks; Alfred N. Goodman

(57) ABSTRACT

A wedge clamp assembly includes a body having a body cable gripping surface, and a slider having a slider cable gripping surface. The slider cable gripping surface faces the body cable gripping surface to grip a cable. A connector is formed in one of the body and the slider, and includes a slot for moving the slider between closed and locked positions and an end portion formed on the other of the body and the slider. The end portion is axially slidable and rotatable in the slot. A coupling between the body and the slider pivotally connects the slider for movement between the closed position and an open position.

24 Claims, 4 Drawing Sheets

SIDE OPENING, DOUBLE ENVELOPING WEDGE CLAMP

FIELD OF THE INVENTION

The present invention is a wedge cable clamp able to encompass a cable with two wedge components coupled in a side open position to prevent accidental separation and loss of the components.

BACKGROUND OF THE INVENTION

Typically a clamp assembly is used to support the conductor from an overhead feed line to a residential or other structure. The clamp assembly is commonly provided with one of several designs of wire bail or small cable, which is used to attach to a hook or other means at or near the service mast. Conventional clamps are fashioned from pairs of locking wedges which clamp the conductor when tension is applied to the conductor.

To install these conventional devices, the operator must disassemble the two wedges, lay the conductor into the receptacle wedge component, and insert the pressure wedge component into the slots of the receptable wedge component. This operation requires holding each of the two components separately, while maintaining the conductor under tension, which is particularly difficult when working at a significant height above the ground.

All too often, one of the pieces of the wedge assembly is accidentally dropped, requiring a person on the ground to retrieve the part and throw it back up to the lineman on the pole.

SUMMARY OF THE INVENTION

Accordingly, an object of the present invention is to provide a wedge clamp assembly for clamping a cable, such as an electrical conductor, which comprises an assembly of components connected in both the cable receiving and clamp positions, eliminating the need to hold two components separately.

Another object of the present invention is to provide a wedge clamp assembly movable between locked, closed, and open positions for facilitating the ability to totally encompass the cable by one lineman.

A further object of the invention is to provide a wedge clamp assembly that is relatively simple to assemble, use, and manufacture from aluminum, steel, stainless steel, resin, or plastic.

The foregoing objects are basically obtained by a wedge clamp assembly comprising a body having a body cable gripping surface, and a slider having a slider cable gripping surface. The slider cable gripping surface faces the body cable gripping surface to grip a cable. A connector is formed in one of the body and the slider, and includes a slot for moving the slider between closed and locked positions and an end portion formed on the other of the body and the slider. The end portion is axially slidable and rotatable in the slot. A coupling between the body and the slider pivotally connects the slider for movement between the closed position and an open position.

The foregoing objects are also basically attained by a wedge clamp assembly, comprising a body having a body cable gripping surface, and a slider having a slider cable gripping surface. The slider cable gripping surface faces the body cable gripping surface to grip a cable. A connector formed in the body includes a body slot for moving the slider between closed and locked positions, an end portion formed on the slider and axially slidable and rotatable in the slot. A coupling between the body and the slider pivotally connects the slider for movement between the closed position and an open position. The body includes an outwardly extending abutment portion with a top edge feature for maintaining the alignment of the slider and body when moved between the closed and locked positions. The slider includes an outwardly extending shoulder portion and a slider slot for interleaving with the abutment portion top edge feature.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring to the drawings which form a part of this disclosure.

DETAILED DESCRIPTION OF THE INVENTION

Figure 1:
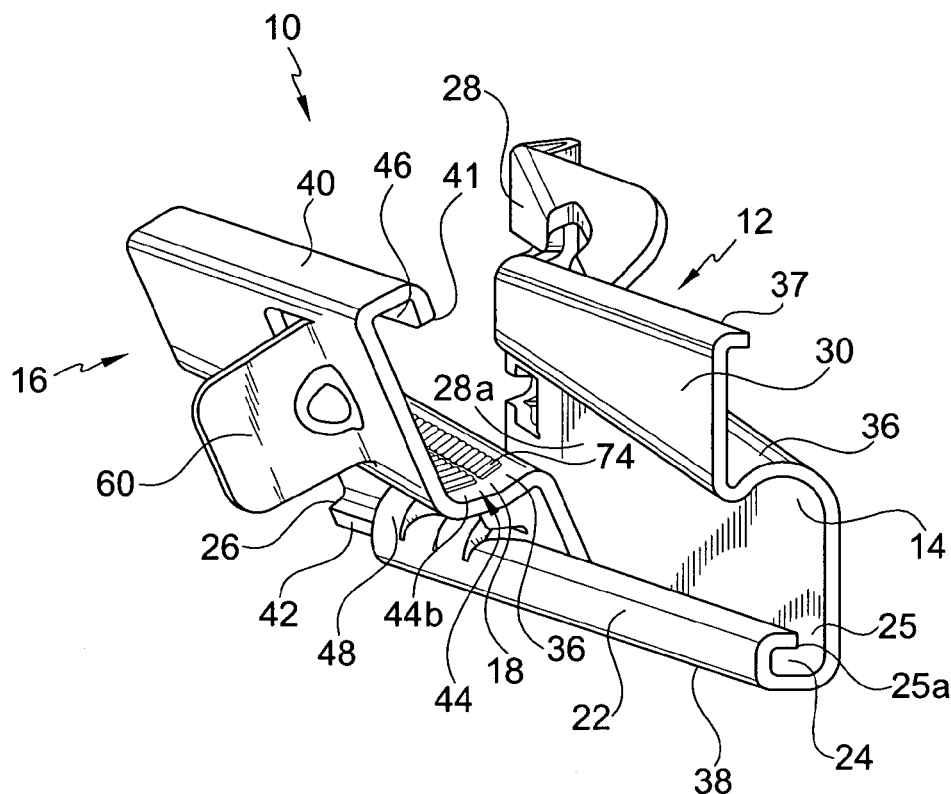
FIG. 1 is a front perspective view of the wedge clamp according to an embodiment of the present invention, in an open position for receiving a cable, such as an electrical conductor.
Figure 2:
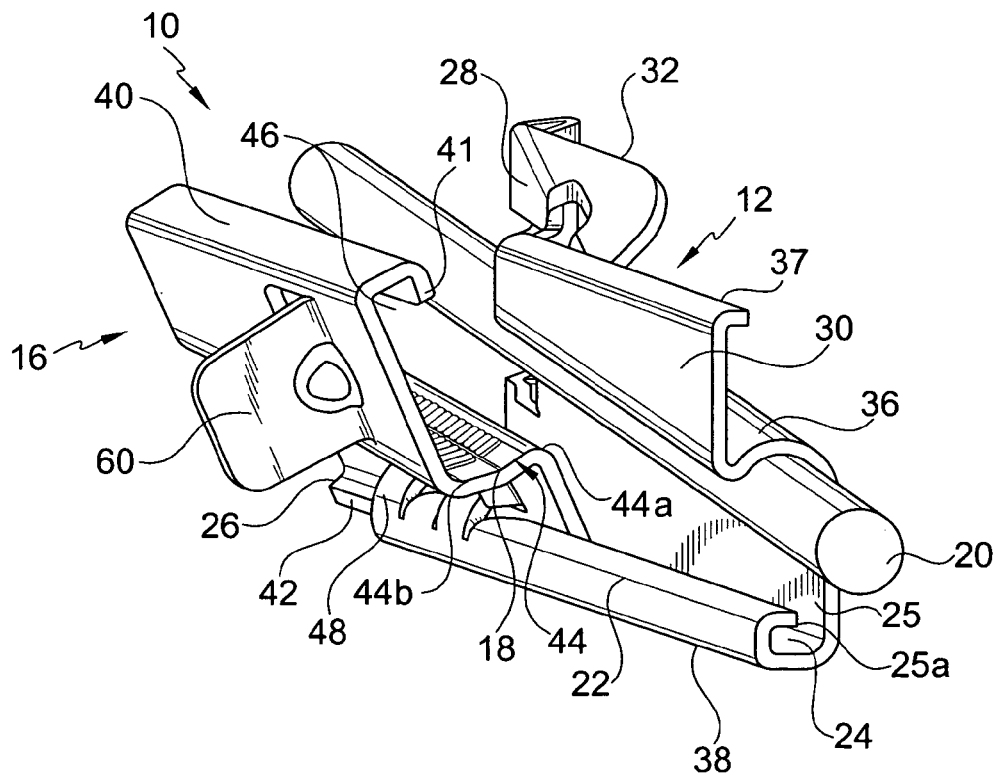
FIG. 2 is a front perspective view of the wedge clamp assembly of FIG. 1 in an open position with the cable nested into the body cable gripping surface.

As illustrated, in FIGS. 1-7, the wedge cable assembly 10 in accordance with the present invention comprises a body 12 having a body cable gripping surface 14 and a slider 16 having a slider cable gripping surface 18. The slider cable gripping surface 18 faces the body cable gripping surface 14 to grip a cable 20 between those two surfaces. A connector 22 is formed on the body. As best seen in FIG. 1, the connector 22 includes a body slot 24 for guiding an end portion 26 of slider 16 for axially sliding and rotatably pivoting the slider 16 relative to body 12. Slider 16 is movable between an open position (FIGS. 1-4) to receive the cable, a closed position (FIG. 5) to begin to clamping operation and a locked position (FIG. 6) to secure the cable.

The connecting parts of the wedge clamp assembly 10 can be rearranged with the connector formed on the slider 16 and the end portion 26 disposed on the body 12. The location of connector 22, body slot 24, and end portion 26 are thus interchangeable between the body and the slider.

Figure 3:
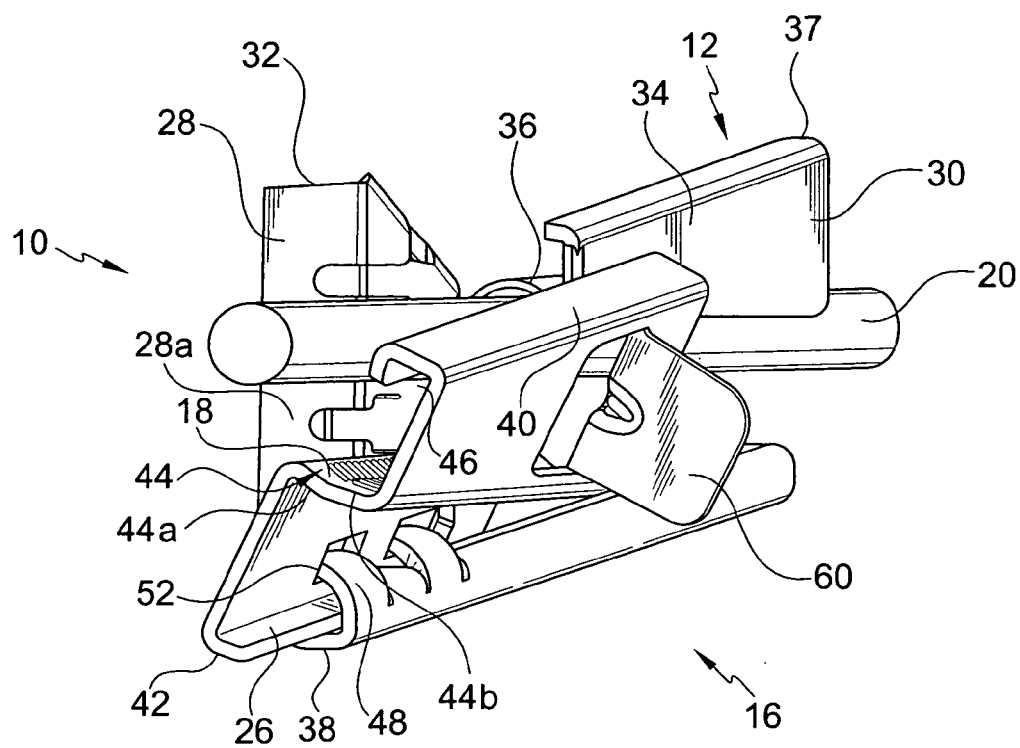
FIG. 3 is a side perspective view of the wedge clamp assembly of FIG. 1 in the open position with the cable nested into the body cable gripping surface.
Figure 4:
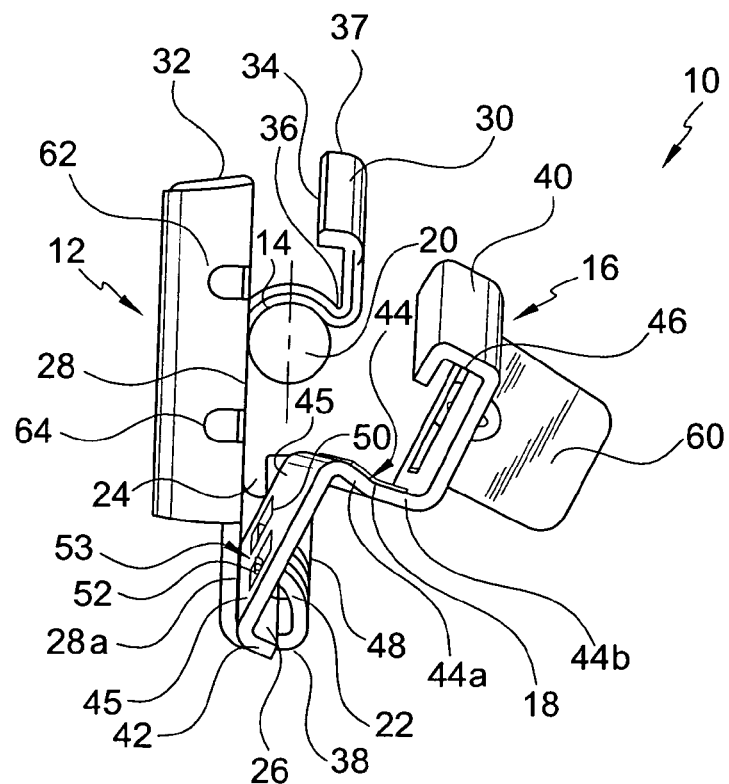
FIG. 4 is a side elevational view of the wedge clamp assembly of FIG. 1 in the open position.

As illustrated in FIGS. 3-4, the body 12 has a first section 28 and a second section 30. The first section 28 is substantially planar and includes a top edge 32. The second section includes a planar portion 34 having a top edge feature 37 and an outwardly extending abutment 36. The outwardly extending abutment 36 is arcuately shaped, defines the body cable gripping surface 14, and is at an angle relative to top edge 32. The first section 28 and second section 30 has a continuous bottom edge 38. The bottom edge 38 is substantially U-shaped. A distal end of the bottom edge 38 curves upwardly and inwardly for forming the connector 22 and body slot 24 with its restricted opening 25 between edge 25a and a planar section 28a of first section 28.

The slider includes a top edge 40, a bottom edge 42, and an outwardly extending shoulder portion 44. The top edge 40 is a substantially U-shaped flange having an inwardly and downwardly extending distal end 41 and forming a slider slot 46. Centrally disposed on the slider is the outwardly extending shoulder portion 44. The outwardly extending shoulder portion 44 has a planar portion 44a and a curved portion 44b forming the slider cable gripping surface 18, and extends at an acute angle relative to the top edge 40 and bottom edges 42, which angle is substantially equal to the angle of abutment 36. The bottom edge 42 of the slider is substantially L-shaped and extends outwardly. The outwardly extending L-shaped configuration of the bottom edge 42 is arranged for the slider to mate with the connector 22 and to be received in body slot 24.

A coupling 48 is disposed between the body 12 and the slider 16. The coupling 48 pivotally connects the slider for movement between open and closed positions. The coupling 48 can be any suitable fastener such as a hinge, latch, hook, clip, clasp, cable, or wire. As best seen in FIG. 4, the preferred coupling 48 has plural hinge tabs 50 and mating apertures 52. The hinge tabs 50 and the apertures 52 interact to releasably retain the two wedges against separation, while preventing axial sliding and allowing pivoting of the slider relative to the body, about the longitudinal axis of connector 22. The hinge tabs 50 are disposed on the body 12, and the apertures are on the slider 16. However, the location of these parts could be interchanged with the hinge tabs disposed on the slider 16 and the apertures 52 disposed on the body 12.

Preferably, as seen in FIG. 4, hinge tabs 50 are formed at a distal end of the continuous bottom edge 38. Apertures 52 are disposed proximate the bottom edge 42 of slider 16. Each hinge tab 50 is curved upwardly and inwardly from the upper portion of connector. Each aperture 52 is substantially rectangularly shaped and receives the respective hinge tab 50. The hinge tabs 50 and corresponding apertures 52 could be any polygonal shape or combination of polygonal shapes. Lastly, a space 53 (FIG. 4) is provided between adjacent hinge tabs for facilitating the slider to pivot relative to the body 12. The free ends of the hinge tabs 50 are spaced from body planar section 28a by a distance greater than the thickness of the slider planar surface 45 (FIG. 4) in which apertures 52 are located.

During normal operation, the slider 16 is advanced from the closed (FIG. 5) to the locked position (FIG. 6) for gripping a cable 20. As the slider 16 is advanced, the top edge feature 37 of the outwardly extending abutment portion 36 interleaves with slider slot 46 for maintaining alignment of the slider 16. At this point, a receiving area is defined between outwardly extending abutment portion 36 and outwardly extending shoulder portion 44. As the slider is advanced, the size of the transverse cross-sectional area in the receiving space decreases due to the acutely angled surfaces of body cable gripping portion 14 and slider cable gripping portion 18. The acutely angled surfaces move toward one another to increase the clamping force on the cable with increasing tension on the cable. As the slider moves to the locked position, body cable gripping portion 14 and slider cable gripping portion 18 move toward one another while remaining parallel. Thus, cable 20 is clamped between body cable gripping portion 14 and slider cable gripping portion 18. Acutely angled surfaces also limit advancement of the slider 16. As the slider 16 is moved axially towards the locked position, body cable gripping portion 14 and slider cable gripping portion 18 engage one another at a predetermined point.

Figure 5:
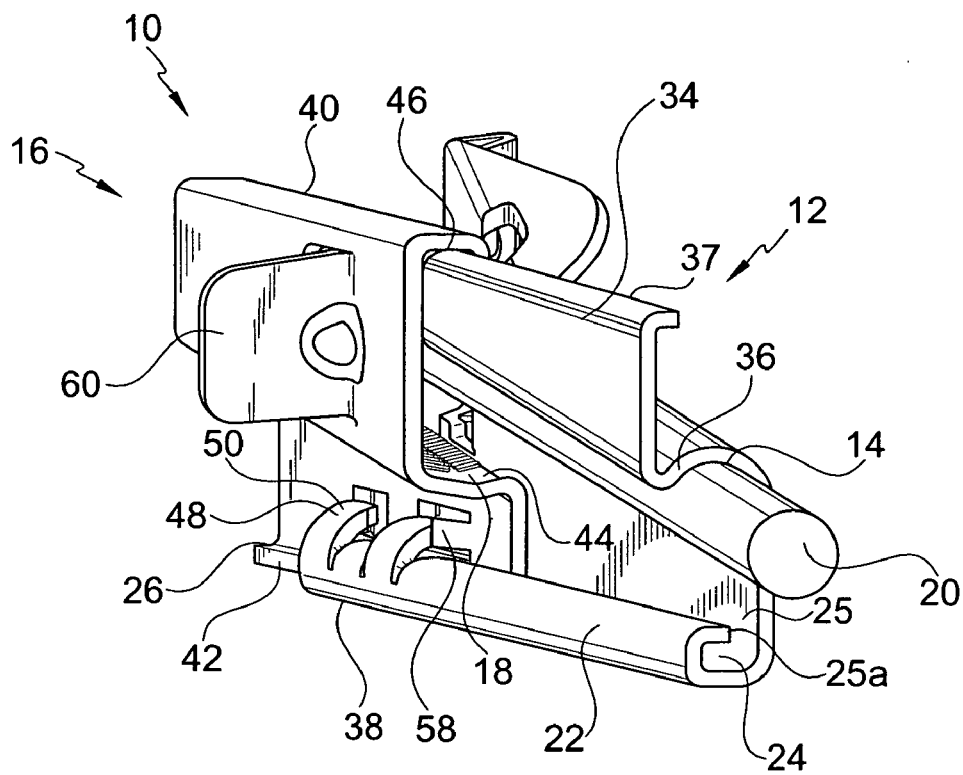
FIG. 5 is a front perspective view of the wedge clamp assembly of FIG. 1 in the closed position.

The wedge clamp assembly 10 is provided with a stop tab 58 (FIG. 5). The stop tab 58 limits retraction of the wedge clamp assembly 10. When the slider 16 is moved from the locked position to the closed position, the stop tab 58 is positioned proximate the coupling 48. As seen in FIG. 5, stop tab 58 abuts coupling 48, preferably at hinge tab 50, for limiting travel of slider 16. Moreover, stop tab 58 acts as an alignment device. At the point stop tab 58 engages hinge tab 50, slider apertures 52 are aligned with hinge tabs 50, and slider slot 46 is no longer engaged with top edge feature 37. Slider 16 can now pivot between closed (FIG. 5) and open (FIGS. 1-4) positions. Stop tab 58 extends outwardly from slider planar section 45 at an acute angle toward apertures 52.

Figure 7:
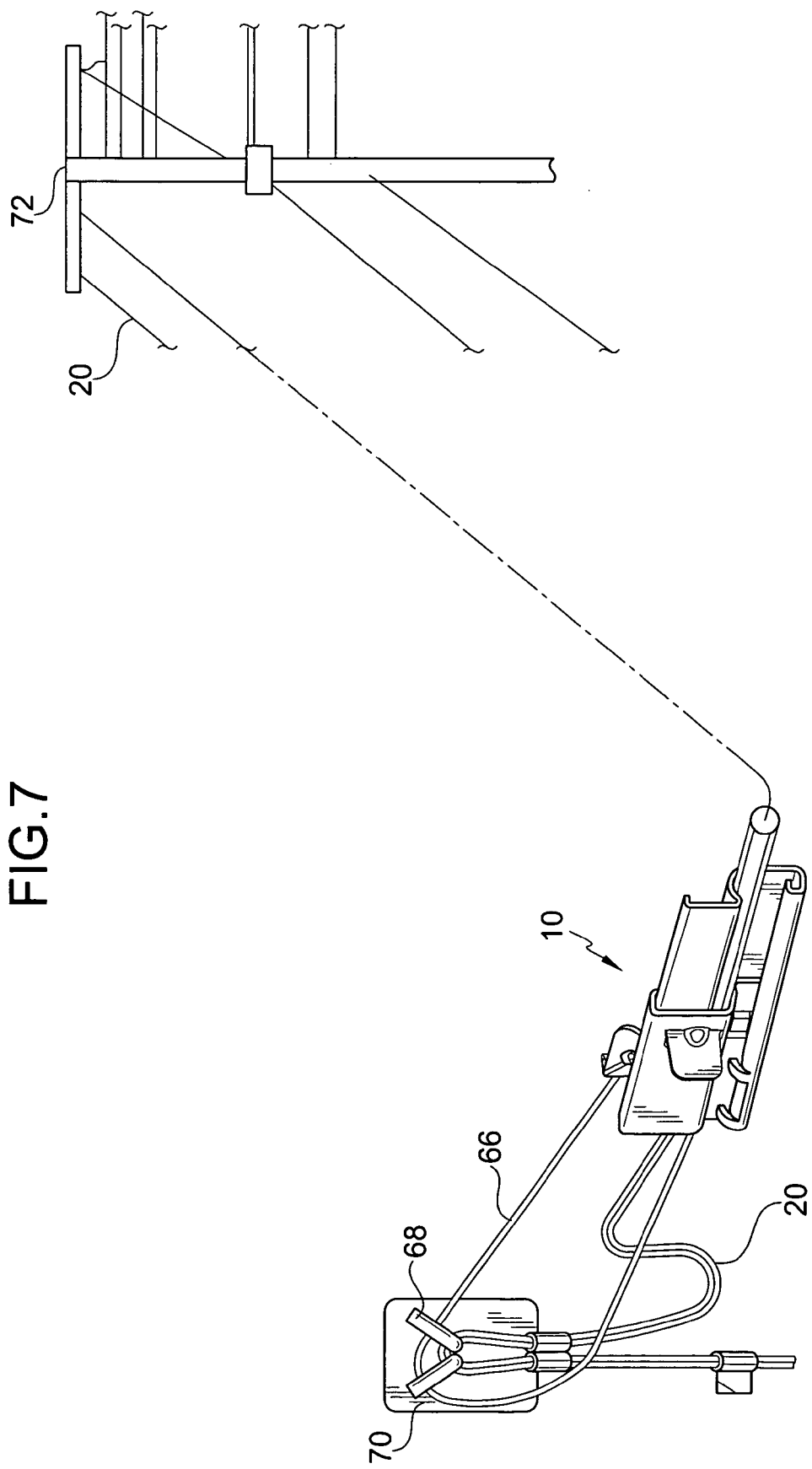
FIG. 7 is a perspective view of the wedge clamp assembly of FIG. 1 clamped to a cable for supporting a connection between an overhead feed line and a service mast.

As seen in FIG. 4, slider 16 includes a handle 60 for facilitating advancement or retraction of the slider by hand. The body 12 includes an upper eyelet 62 and/or lower guide tab slot 64 for attaching and facilitating attachment to a bail 66. As best seen in FIG. 7, the bail 66 is used to attach to a fastener means or hook 68. The fastener means or hook 68 is in turn is attached to a service mast 70. Cable 20 is an overhead feed line connected to a source such as a transmission tower 72. Thus, the wedge clamp assembly 10 is attached to the service mast 70 and acts as an anchoring device for cable 20.

Lastly, as seen in FIG. 1, the slider cable gripping surface 18 includes frictional enhancing features 74 such as gripping teeth, protrusions, an abraded surface, an adhesive surface coating, or the like. Such features augment frictional engagement between cable 20 and slider 16. Slider 16 is urged in the direction of cable 20. The gripping strength of wedge clamp assembly 10 is increased. Slider 16 is moved into more complete engagement and pressure on cable 20 increases as tension increases. Additionally, body cable gripping surface 14 may include a frictional reducing feature or coating such as a lubricant, polytetrafluoroethylene, or the like.

The wedge clamp assembly 10 is manufactured (e.g. cast, molded, etc.) from a strip stock material such as aluminum, steel, stainless steel, any suitable metal or metal alloy, resin, or plastic.

Assembly and Operation

The wedge clamp assembly 10 of the present invention is used as anchoring device for a cable 20 connected to a standard electrical service mast 70. Therefore, the first step is to insert bail 66 through lower guide tab slot 64. A tab feature at the rear of lower guide tab slot 64 is then bent to a closed position for preventing bail 66 from disengaging from wedge clamp assembly 10. A tab feature of upper eyelet 62 may also be positioned for preventing accidental disengagement of the bail after installation of the wedge clamp assembly 10. Tab features of lower guide tab slot 64 and upper eyelet 62 are bent into a closed position. Bail 66 is in turn attached to service mast 70 as is known in the art. Consequently, body 12 is in position for use as an anchoring device for supporting cable 20.

As seen in FIG. 1, wedge clamp assembly 10 is fully constructed and ready to receive a cable 20. The connector preferably is factory assembled by first connecting slider 16 to body 12 by placing end portion 26 into connector 22. Slider 16 is then moved axially along body slot 24. Slider 16 is moved until stop tab 58 moves under hinge tabs 50. Hinge tabs 50 force stop tab 58 to deflect inward. Stop tab 58 is now able to move past hinge tabs 50. Upon disengagement with hinge tabs 50, stop tab 58 flexes outward to an original position and axial movement is limited beyond hinge tabs 50, thus preventing reversal of the assembly.

The slider 16 is now pivotally connected to the body 12 by coupling 48. As seen in FIG. 4, upon connecting hinge tabs 50 to apertures 52, the slider is rotated to an open position for receiving the cable 20 as the hinge tabs 50 pass through the apertures 52. The pivoting is limited by the planar portion 45 of the slider 16 abutting connector 22. As best seen in FIG. 5, once the cable 20 is inserted into the body cable gripping surface 14, the slider 16 is rotated to the closed position.

Figure 6:
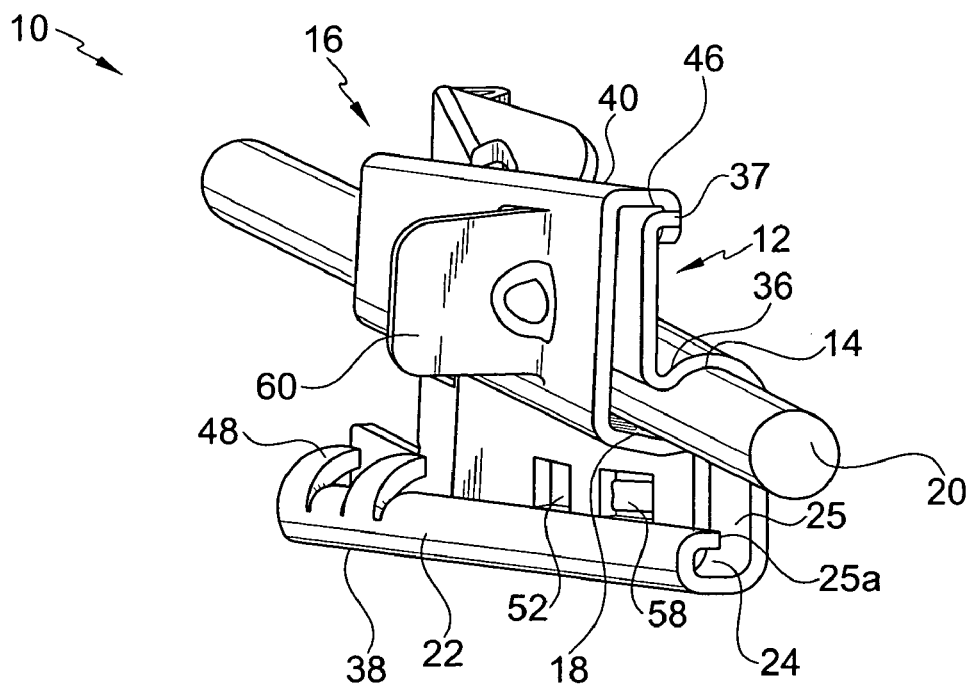
FIG. 6 is a front perspective view of the wedge clamp assembly of FIG. 1 in the locked position.

Next, as depicted in FIG. 6, the slider 16 is advanced axially. Slider slot 46 receives top edge feature 37 for maintaining alignment. Subsequently, the slider is advanced until cable 20 is gripped between body cable gripping surface 14 and slider cable gripping surface 18 in the locked position. The gripping strength can be increased by using frictionally enhancing gripping elements 74, such as gripping teeth. Advancement is facilitated by utilizing handle 60. Advancement of the slider is limited by acutely angled surfaces of body cable gripping surface 14 and slider cable gripping surface 18.

To release the wedge clamp assembly 10, handle 60 is used to retract the slider 16. The slider 16 is retracted until stop tab 58 abuts hinge tab 50. At this time, the hinge tabs 50 and apertures 52 are aligned. Slider slot 46 is no longer engaged with top edge feature 37. Therefore, slider 16 can be pivoted and rotated within connector 22 to an open position for releasing the wedge clamp assembly 10.

While advantageous embodiments have been chosen to illustrate the invention, it will be understood by those skilled in the art that various changes and modifications can be made therein without departing from the scope of the invention as defined in the appended claims.

What is claimed is:

1. A wedge clamp assembly, comprising:
   a body having a body cable gripping surface;
   a slider having a slider cable gripping surface, said slider cable gripping surface facing said body cable gripping surface to grip a cable therebetween;
   a connector formed in one of said body and said slider including a slot for moving the slider between closed and locked positions, an end portion formed on the other of said body and said slider, said end portion being axially slidable along a longitudinal axis and rotatable about said longitudinal axis in said slot, said gripping surfaces being oriented at an acute angle relative to said longitudinal axis; and
   a coupling between said body and said slider, adapted for pivotally connecting said slider between said closed and an open position.

2. A wedge clamp assembly according to claim 1, wherein said body includes an outwardly extending abutment portion, including a top edge feature for maintaining alignment of the slider when being moved between said closed and said locked positions.

3. A wedge clamp assembly according to claim 2, wherein said slider includes an outwardly extending shoulder portion, and a slider slot for sliding on said top edge feature.

4. A wedge clamp assembly according to claim 3, wherein said outwardly extending abutment portion and said outwardly extending shoulder portion include acutely angled surfaces for limiting advancement of said slider.

5. A wedge clamp assembly according to claim 1, wherein said coupling includes at least one hinge tab disposed on one of said body and said slider, and at least one aperture on the other of said body and said slider.

6. A wedge clamp assembly according to claim 1, wherein one of said slider and said body portion includes a stop element thereon for limiting retraction of said slider.

7. A wedge clamp assembly according to claim 1, wherein said slider includes a handle for facilitating advancement or retraction.

8. A wedge clamp assembly according to claim 1, wherein said body includes at least one support feature for connecting said body to a service mast cable.

9. A wedge clamp assembly according to claim 8, wherein said body includes a guide tab for guiding said service mast cable to said at least one support feature.

10. A wedge clamp assembly according to claim 1, wherein said wedge clamp assembly is manufactured of one of aluminum, steel, resin, plastic and stainless steel.

11. A wedge clamp assembly according to claim 1, wherein at least one of said body cable gripping surface and said slider cable gripping surface includes frictionally enhancing surface features.

12. A wedge clamp assembly, comprising:
    a body having a body cable gripping surface;
    a slider having a slider cable gripping surface, said slider cable gripping surface facing said body cable gripping surface to grip a cable therebetween;
    a connector formed in said body including a body slot for moving the slider between closed and locked positions, an end portion formed on said slider, said end portion being axially slidable along a longitudinal axis and rotatable about said longitudinal axis in said slot said gripping surfaces being oriented at an acute angle relative to said longitudinal axis; and
    a coupling between said body and said slider, adapted for pivotally connecting said slider between said closed and an open position.

13. A clamp assembly according to claim 12, wherein said body includes an outwardly extending abutment portion, including a top edge feature for maintaining the alignment of the slider when being positioned between said closed and said locked positions.

14. A clamp assembly according to claim 13, wherein said slider includes an outwardly extending shoulder portion, and a slider slot for sliding on said top edge feature.

15. A clamp assembly according to claim 14, wherein said outwardly extending abutment portion and said outwardly extending shoulder portion include acutely angled surfaces for limiting advancement of said slider.

16. A clamp assembly according to claim 12, wherein said coupling includes at least one hinge tab disposed on said body, and at least one aperture on said slider.

17. A clamp assembly according to claim 12, wherein said slider includes a stop element for limiting retraction of said slider.

18. A clamp assembly according to claim 12, wherein said slider includes a handle for facilitating advancement or retraction.

19. A clamp assembly according to claim 12, wherein said body includes at least one support feature for connecting said body to a service mast cable.

20. A clamp assembly according to claim 12, wherein at least one of said body cable gripping surface or said slider cable gripping surface includes frictionally enhancing surface features.

21. A clamp assembly according to claim 5, wherein said hinge tab is disposed in said at least one aperture when said slider pivots about said longitudinal axis and prevents said slider from moving axially along said longitudinal axis.

22. A clamp assembly according to claim 21, wherein said hinge tab is disposed outside of said at least one aperture, said slider can move axially along said longitudinal axis.

23. A clamp assembly according to claim 12, wherein said coupling includes at least one hinge tab that is disposed in said at least one aperture when said slider pivots about said longitudinal axis and prevents said slider from moving axially along said longitudinal axis.

24. A clamp assembly according to claim 23, wherein said hinge tab is disposed outside of said at least one aperture, said slider can move axially along said longitudinal axis.

* * * * *